G. STANTON & J. D. WALTERS.
CHRISTMAS TREE HOLDER.
APPLICATION FILED JUNE 14, 1916.
1,217,655.
Patented Feb. 27, 1917.
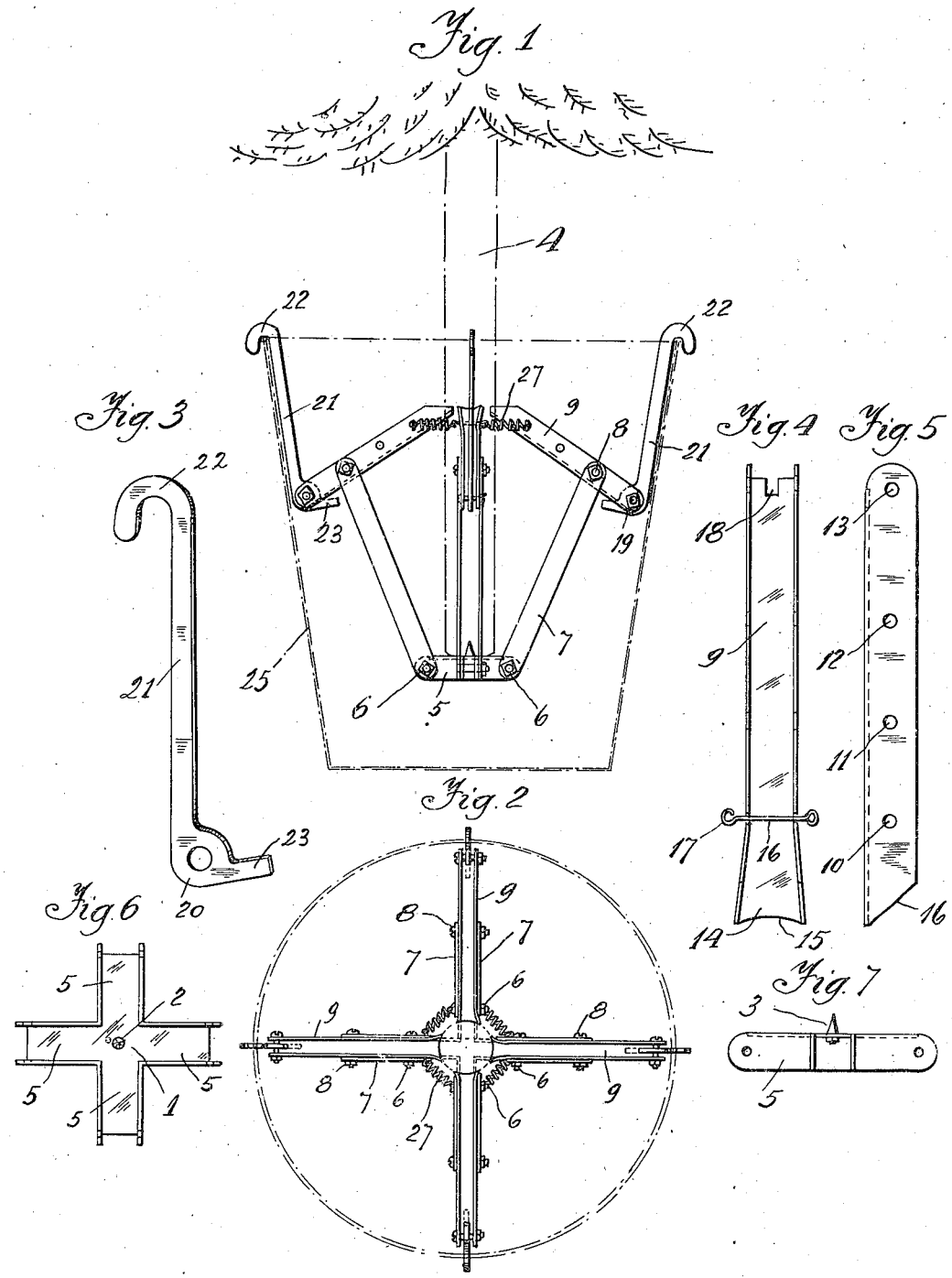
INVENTOR
George Stanton &
John D. Walters

UNITED STATES PATENT OFFICE.

GEORGE STANTON AND JOHN D. WALTERS, OF BRADDOCK, PENNSYLVANIA.

CHRISTMAS-TREE HOLDER.

1,217,655.  Specification of Letters Patent.  Patented Feb. 27, 1917.

Application filed June 14, 1916. Serial No. 103,625.

*To all whom it may concern:*

Be it known that we, GEORGE STANTON and JOHN D. WALTERS, citizens of the United States, residing at Braddock, county of Allegheny, and State of Pennsylvania, have invented certain new and useful Improvements in Christmas-Tree Holders, of which the following is a specification.

This invention relates to Christmas tree holders and has for its object to provide means, in a manner as hereinafter set forth, for supporting and suspending a Christmas tree in an upright position within a receptacle containing water for the purpose of keeping the tree fresh and by such an arrangement preventing the falling off of the needles of the tree.

A further object of the invention is to provide, in a manner as hereinafter set forth, a Christmas tree holder for supporting a tree or the like in an upright position, and which can be readily applied to the base of a tree and conveniently positioned within a receptacle, so as to hold the tree in a desired position, and furthermore which can be readily collapsed so as to occupy a minimum amount of space when not in use.

Further objects of the invention are to provide a Christmas tree holder which is simple in its construction and arrangement, strong, durable, efficient and convenient in its use, readily assembled, and inexpensive to manufacture.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an elevation of the holder showing the adaptation thereof in connection with a tree and with a receptacle, the latter being shown in dotted lines.

Fig. 2 is a top plan view.

Fig. 3 is a side elevation of the suspension hook.

Fig. 4 is a top plan view of a clamping or gripping lever.

Fig. 5 is a side elevation of a clamping or gripping lever.

Fig 6 is a plan and Fig. 7 a side view of the base.

Referring to the drawings in detail 1 denotes a cruciform-shaped base having a centrally disposed opening 2 through which extends a vertical member or screw 3, which is adapted to engage in the bottom of the tree 4, which is supported on the base 1.

To the outer end of each of the arms 5 of the base 1 is pivotally connected, as at 6, the lower ends of a pair of elongated links 7, which are arranged in parallelism.

The upper ends of each pair of links 7 are provided with a pivot 8 and upon which is mounted, as well as positioned between the pairs of links, a clamping lever 9 which is formed with transverse openings 10, 11, 12 and 13. The upper end of each of the levers is flared as at 14, to provide what may be termed a gripping head and with the edges thereof rounded as at 15 so as to grip the trunk of a tree 4. The top edge of the lever 9 at its inner end, is beveled as at 16.

The openings 11 and 12 provide for the adjustable mounting of the lever 9 on a pivot 8. The opening 10 is provided to permit of extending through the lever 9, near its inner end, a coupling member 16 having an eye 17 at each end. The eyes 17 are arranged exteriorly of the lever 9.

The outer end of the lever 9 is bifurcated as at 18 and in said bifurcated end is arranged the opening 13. Mounted in the opening 13 at the outer end of the lever 9 is a pivot 19.

Loosely mounted upon the pivot 19 is the base 20, of the shank 21, of a suspension hook 22. Formed integral with the base 20 and projecting laterally therefrom is an arm 23, which extends under the outer end of the lever 9, and provides a stop to arrest downward movement of the inner end of the lever 9 when the holder is mounted in the receptacle 25 and when the tree 4 is not engaged by the gripping heads 14 of the clamping levers.

When the holder is mounted in position, the suspension hooks 23 grip over the top edge 26 of the receptacle 25, and the shanks 21 are positioned against the inner face of the receptacle. When the tree 4 is mounted upon the base 1, the weight of the tree will force the base down against the action of the suspension hooks 22, but this action will cause the clamping levers 9, not only to swing on their pivots 8 but also on the pivots 19, and the gripping heads of the levers 9 will be forced against the trunk of the tree gripping the same and maintaining the tree in an upright position.

Interposed between the inner ends of the clamping levers and connected to the eyes 17, of the coupling members, are coiled springs 27 for maintaining the inner ends of the clamping levers in alinement with respect to each other, and the said springs 26 are detachably connected with the eyes 17.

What we claim is:—

1. A Christmas tree holder comprising a base, supports pivotally connected therewith, tree clamping levers pivotally carried by said supports, and suspension hooks pivotally connected with said levers and adapted to engage with the edge of a receptacle for suspending the base therein.

2. A Christmas tree holder comprising a base, supports pivotally connected therewith, tree clamping levers pivotally carried by said supports, and suspension hooks pivotally connected with said levers and adapted to engage with the edge of a receptacle for suspending the base therein, and means carried by the suspension hooks and engaging said clamping levers for arresting the downward movement of the inner end of said levers.

3. A Christmas tree holder comprising a base, supports pivotally connected therewith, tree clamping levers pivotally carried by said supports, suspension hooks pivotally connected with said levers and adapted to engage with the edge of a receptacle for suspending the base therein, and means carried by the base and adapted to engage in the trunk of a tree for connecting the latter to the base.

4. A Christmas tree holder comprising a base, supports pivotally connected therewith, tree clamping levers pivotally carried by said supports, and suspension hooks pivotally connected with said levers and adapted to engage with the edge of a receptacle for suspending the base therein, and said levers provided with means whereby the fulcrum thereof can be adjusted.

5. A Christmas tree holder comprising a base, gripping levers pivotally supported therefrom, and suspension hooks adapted to engage with a receptacle for suspending the base within the receptacle and for shifting said levers to grip the trunk of a tree to maintain the latter in a vertical position when the trunk is mounted upon said base.

6. A Christmas tree holder comprising a base, gripping levers pivotally supported therefrom, and suspension hooks adapted to engage with a receptacle for suspending the base within the receptacle and for shifting said levers to grip the trunk of a tree to maintain the latter in a vertical position when the trunk is mounted upon said base, and means carried by said hooks for limiting the pivoting movement of said levers in one direction when the trunk of the tree is moved from the base and the latter suspended within the receptacle.

7. A Christmas tree holder comprising means for supporting the trunk of a tree, clamping levers pivotally connected with said support capable of engaging the trunk of a tree to maintain the latter in an upright position, and suspension hooks connected with said clamping levers and adapted to engage with a receptacle for suspending said means within the receptacle and for swinging said clamping levers to grip the trunk to maintain it in an upright position.

8. A Christmas tree holder comprising a tree-support provided with shiftable tree-gripping elements, suspension members for said tree-support and adapted to connect with and depend from an anchoring means, said members connected to said elements and shifting them in a direction to grip the tree to maintain it in an upright position when the weight of the tree bears upon said tree-support.

9. A Christmas tree holder comprising a tree-support provided with shiftable tree-gripping elements, suspension members for said tree-support and adapted to connect with and depend from an anchoring means, said members connected to said elements and shifting them in a direction to grip the tree to maintain it in an upright position when the weight of the tree bears upon said tree-support, and said members having means abutting against said elements to limit the shifting movement thereof in one direction when the weight of the tree is off the tree-support.

In testimony whereof we affix our signatures in the presence of two witnesses.

GEORGE STANTON.
JOHN D. WALTERS.

Witnesses:
LUELLA H. SIMON,
B. E. JENKINS.